United States Patent [19]

Ross

[11] 4,375,531

[45] Mar. 1, 1983

[54] HIGH IMPACT VISBROKEN POLYMERIC BLENDS

[75] Inventor: James F. Ross, Naperville, Ill.

[73] Assignee: Northern Petrochemical Company, Omaha, Nebr.

[21] Appl. No.: 338,412

[22] Filed: Jan. 11, 1982

[51] Int. Cl.$^3$ .................... C08L 23/26; C08L 23/10; C08L 53/00

[52] U.S. Cl. ......................................... 525/93; 525/88; 525/71; 525/240; 525/198; 525/222; 525/227; 525/941

[58] Field of Search .................... 525/240, 88, 93, 71, 525/222, 227, 198

[56] References Cited

U.S. PATENT DOCUMENTS

| | | | |
|---|---|---|---|
| 3,121,070 | 2/1964 | Coover et al. ...................... | 525/240 |
| 3,420,916 | 1/1969 | Liu et al. ............................ | 525/240 |
| 3,954,704 | 5/1976 | Verne et al. ........................ | 525/88 |
| 4,282,076 | 8/1981 | Boynton ............................. | 525/240 |
| 4,312,964 | 1/1982 | Sekine et al. ...................... | 525/88 |

*Primary Examiner*—Carman J. Seccuro
*Attorney, Agent, or Firm*—Donald F. Haas

[57] ABSTRACT

A high melt flow rate, high impact, visbroken polymeric material is disclosed which comprises a first component which is selected from the group consisting of block copolymers of propylene and ethylene, reactor-made intimate mixtures of propylene and randomly oriented copolymers of propylene and ethylene, and blends of polypropylene and randomly oriented copolymers of propylene and ethylene, and the second component which is selected from the group consisting low density polyethylene, ethylene-vinyl acetate copolymers, acrylate-modified polyethylenes, high density polyethylene, ethylene-propylene rubber (EPR or EPDM), and blends thereof. The two components are first blended and then visbroken.

10 Claims, No Drawings

HIGH IMPACT VISBROKEN POLYMERIC BLENDS

BACKGROUND OF THE INVENTION

The present invention relates to blends of polypropylene based polymeric materials which are visbroken in order to impart to them both high impact and high melt flow rate properties. Impact strength properties are strongly dependent upon the melt flow rate of the polymer. Polymers which have a low (e.g., fractional) melt flow rate and are processable only with difficulty inherently have better impact resistance than the easily processed higher melt flow rate polymers. The combination of high melt flow rate and high impact resistance has heretofore not been obtained.

It is well-known in the art to blend polypropylene homopolymer with low or high density polyethylene and ethylene-propylene rubber in order to increase the impact resistance of the polymer without too great a sacrifice in stiffness. U.S. Pat. No. 4,088,714 discloses that the impact properties of polypropylene and cross-linkable low density polyethylene blends could be significantly improved by the addition of an ethylene-propylene rubber to the blend, and then curing the rubber with the cross-linkable polyethylene to form a discontinuous, tightly cross-linked phase of rubber and polyethylene which is intimately dispersed in a continuous phase of polypropylene. An agent is incorporated to prevent degradation of the polypropylene. The total blend assumed a beneficial melt flowable characteristic. The stiffness and tensile strength of this blend is comparatively low. The flexural moduli (1 percent secant) were only in the range of 20,000–36,000 psi (140–250 MPa) and the tensile strengths at yield were under 1500 psi (10 MPa). For the blends of the present invention, the flexural moduli are generally about 90,000 psi (600 MPa) and the tensile strengths are generally about 2900 psi (20 MPa). In U.S. Pat. No. 4,087,485 it was disclosed that an impact polypropylene blend having surprisingly good optical properties could be formulated by partially curing an ethylene-propylene rubber with a cross-linkable low density polyethylene in the presence of polypropylene. U.S. Pat. No. 4,221,882 discloses a melt-flowable, high impact stength melt mixed blend of polypropylene, ethylene-propylene rubber, and polyethylene wherein the ratio of the polypropylene to the combination of the other components is from about 1 to about 2, the polyethylene component is at least about 30 percent of the total blend, and the rubber component is from 4 to 11 percent of the total blend. In none of the above patents were the inventors working with the components of the present invention nor do they disclose visbreaking of the components after blending and the advantages thereof.

Visbreaking of polymers, a process for the controlled degradation thereof, is well-known. U.S. Pat. No. 3,144,436 discloses such a process for preparing low or moderate molecular weight stereoregular polymers which are more easily processable than stereoregular polymers of very high molecular weight. The high molecular weight stereoregular polymers are treated in the absence of oxygen at a temperature above the melting point of the polymer with a small amount of a free radical initiator to increase the melt flow rate of the polymers. U.S. Pat. No. 3,940,739 discloses a method for the degradation of propylene polymers to increase their melt flow rate which comprises contacting a propylene polymer with oxygen and an organic or inorganic peroxide, melting and working the resulting mixture in a high shear zone, and recovering an essentially odor-free propylene polymer. U.S. Pat. No. 4,061,694 discloses the manufacture of polypropylene molding compositions of improved impact strength by subjecting block copolymers of ethylene and propylene to controlled oxidative degradation under conditions essentially similar to those of the preceding patent. U.S. Pat. No. 3,923,947 discloses a process for preparing cross-linkable polyethylene compositions by contacting the compositions with a peroxy compound at a temperature above the melting point of the composition. The polyethylene composition can be a blend of high and low density polyethylene, low density polyethylene and ethylene vinyl acetate, high density polyethylene and ethylene vinyl acetate, and blends of the above with polypropylene. None of the above patents discloses the advantages of blending the two components of the composition of the present invention and then visbreaking them.

SUMMARY OF THE INVENTION

The present invention relates to a high melt flow rate, high impact, visbroken polymeric composition comprising a first component which is selected from the group consisting of block copolymers of propylene and ethylene, reactor-made intimate mixtures of polypropylene and randomly oriented copolymers of propylene and ethylene, and blends of polypropylene and randomly oriented copolymers of propylene and ethylene; and a second component which is selected from the group consisting of low density polyethylene, ethylene-vinyl acetate copolymers, acrylate-modified polyethylenes, high density polyethylene, ethylene-propylene rubber (EPR or EPDM), and blends thereof. The invention also relates to a method for producing such polymeric compositions which comprises first blending the two components and then visbreaking the resulting blend. The visbreaking may be carried out in the presence of a peroxide at the following conditions: peroxide concentrations of 50–2000 ppm, depending upon initial and final melt flow rate; melt temperatures of 350°–550° F.; and reaction to take place in a single or twin screw extruder. Thermal visbreaking can also be used. The conditions are: no free radical initiators or process or heat stabilizers are to be used; melt temperatures in excess of 550° F., preferably 600°–800° F.; and the reaction to take place in a single or twin screw extruder.

DETAILED DESCRIPTION OF THE INVENTION

As stated above, the invention relates to the production of high melt flow rate, high impact polymeric compositions and to the compositions themselves. They are produced by blending a first component and a second component and then visbreaking the blend. Normally, when a polymeric material with a high flow rate is synthesized in a reactor, properties such as impact resistance are sacrificed. By following the present invention, one starts with a lower melt flow material, visbreaks it, and obtains a material with a high melt flow rate and high impact resistance. Polymers with such properties can be obtained by blending high density polyethylene, ethylene-propylene rubber and polypropylene but there are economic advantages in obtaining the polymers by the method of the present invention. These are: the cost of expensive ethylene-propylene rubber; the presence of vanadium catalyst residues from commercially available ethylene-propylene rubber; the need for larger, more complex blending and extruding equipment when more than about 10 percent of a secondary material is blended into base polymers; additional energy costs of compounding and/or extruding the extra material added; and the loss of stiffness and tensile strength relative to the blends of the present invention.

The first component is basically a medium impact, high propylene content polymeric material. It is selected from the group consisting of block copolymers of propylene and ethylene, reactor-made intimate mixtures of polypropylene and randomly oriented copolymers of propylene and ethylene, and blends of polypropylene and randomly oriented copolymers of propylene and ethylene. Block copolymers suitable for use in the present invention are made according to U.S. Pat. Nos. 3,970,719 and 4,039,632 or by similar processes well-known in the art. The reactor-made intimate mixtures of polypropylene and randomly oriented copolymers of propylene and ethylene mentioned above are made by a multi-stage polymerization process wherein, in a first, stirred reaction vessel, gaseous propylene is contacted with a polymerization catalyst, preferably of the titanium-ester coordination complex type, and aluminum alkyl. In a second stage, propylene and ethylene are copolymerized in intimate admixture with the polymer formed in the first stage. Blends of polypropylene and randomly oriented copolymers of propylene and ethylene are made simply by synthesizing the two separately and then blending them together.

The second component is basically a high impact material. It is selected from the group consisting of low density polyethylene, ethylene-vinyl acetate copolymers, acrylate-modified polyethylenes, high density polyethylene, ethylene-propylene rubber (EPR or EPDM), and blends thereof.

The two components are blended together by any convenient method, but preferably in the upstream section of the same extruder used for visbreaking, and then subjected to visbreaking conditions. The key feature of this invention is the blending of the components and the subsequent visbreaking to provide high impact properties in combination with a high melt flow index. Visbreaking is actually the controlled degradation of the polymers. There are two well-known methods of visbreaking. One is called chemical visbreaking and involves the use of a peroxide initiator and the other merely involves the use of high temperatures and is called thermal visbreaking.

In chemical visbreaking, the blend of the two components is treated with from about 50 ppm to about 2000 ppm of a free radical initiator such as a peroxide, hyperperoxide, azo or diazo compound, etc. at a temperature above the melting point of the polymeric materials used, usually from about 350° F. to about 550° F. The temperature used must be above the melting point of the polymer and high enough to decompose the initiator. The visbreaking process can take place in an extruder or compounding mixer of the Banbury, FCM, or other type. Good dispersion of the initiator is important. The process is continued until the desired increase in melt flow rate is obtained.

Thermal visbreaking or thermal degradation is carried out under somewhat different conditions. These are: temperatures in excess of 550° F. and the absence of free radical initiators and process or heat stabilizer additives.

EXAMPLE 1

Three different products were made and compared for melt flow rate and impact properties. Product No. 1 was prepared by blending and extruding 10 percent by weight of a low density polyethylene/ethylene vinyl acetate (8 percent vinyl acetate content) copolymer with 90 percent by weight of a previously visbroken reactor-made intimate mixture of polypropylene and randomly oriented copolymers of propylene and ethylene. This resin was visbroken from a 0.5 gram per ten minutes melt flow rate to a 6.7 melt flow rate using 750 parts per million of Luperco 101XL peroxide, 2,5 dimethyl-2,5 bis (t-butyl peroxy) hexane, prior to the final blending/extrusion step. Product No. 2 was prepared by blending 10 percent of the same low density polyethylene/ethylene vinyl acetate copolymer with 90 percent by weight of an unvisbroken reactor synthesized medium impact propylene-ethylene copolymer mixture having a melt flow rate comparable to the other products being compared. The third product was prepared by blending and extruding 10 percent by weight of a low density polyethylene homopolymer (melt flow rate = 1.0 as measured by ASTM test D-1238-79 Condition E) with 90 percent by weight of an unvisbroken sample of the base resin used in Product 1. The blend was visbroken to a 5.5 melt flow rate using 750 parts per million of the above peroxide at the following conditions: melt temperature of 420° F. and 85 rpm in a one-inch Killion extruder. The results are shown in the following Table.

TABLE NO. 1

| Property | Product No. 1 | Product No. 2 | Product No. 3 |
|---|---|---|---|
| Melt flow rate gm/10 min. (1) | 6.7 | 5.7 | 5.5 |
| Izod notched (23° C.), J/M (2) | 179 | 87 | 564 (hinged break) |
| Izod unnotched (−18° C.), J/M (2) | 1331 | 794 | 1364 (hinged break) |
| Gardner impact (−18° C.), NM (3) | 25.8 | 15.6 | 25.1 |
| Tensile Strength @ yield, MPa (4) | 20.6 | 22.7 | 20.5 |
| Flexural Modulus, MPa (5) | 647 | 848 | 634 |

(1) ASTM D-1238-79, Condition L
(2) ASTM D-256-78
(3) ASTM D-3029-78, Procedure B
(4) ASTM D-638-77
(5) ASTM D-790-71, Method 1A The Izod impact tests are measured in units of Joules per meter and measure the impact energy required to break a molded test specimen under the conditions of ASTM test D-256-78. The Gardner impact test is measured in units of Newton-meters and measures the resistance to breakage of a thin, unsupported molded placque by a falling weight under conditions of ASTM test D-3029-78, Procedure B. it can be seen from the above Table that product No. 3, made according to the present invention, exhibits good melt flow rate properties and is superior to the other two products in two of the three impact tests. A comparison of products 1 and 3 demonstrates the necessity of blending the components prior to visbreaking in order to increase the impact resistance both at ambient and low temperature conditions. A comparison of products 2 and 3 demonstrates the necessity of both blending and visbreaking. Note that the tensile strength and stiffness of product 3 did not suffer a significant drop from the starting material. Therefore, product No. 3 has the best overall impact.

EXAMPLE 2

The performance of a visbroken intimate mixture of polypropylene and randomly oriented copolymers of ethylene and propylene was compared with two different blends made with the same resin. Product No. 1 is the visbroken base resin. Product No. 2 is a blend of 90 percent of the base resin and 10 percent of a high density polyethylene homopolymer. Product No. 3 is a blend of 90 percent of the base resin and 10 percent of an ethylene vinyl acetate copolymer. Table 2 shows the properties of the various products. All of the products were prepared by dry-blending the powder with additives and, in the case of the blends, either high density polyethylene or ethylene vinyl acetate copolymer pellets in a mixer with the peroxide used in Example 1. The products were then hot processed through a compounding extruder in order to melt blend and visbreak them.

TABLE NO. 2

| Property | Base Polymer | Prod. No. 1 | Prod. No. 2 | Prod. No. 3 (6) | |
|---|---|---|---|---|---|
| Melt flow rate gm/10 min. (1) | 0.54 | 2.5 | 1.7 | 3.2 | 1.9 |
| Izod notched (23° C.), J/M (2) | 401 | 283 | 807 | 727 | 775 |
| Izod unnotched (−18° C.), J/M (2) | 2147 | 1591 | 2638 | 2275 | 2339 |
| Gardner impact (−18° C.), NM (3) | 27+* | 27+* | 27+* | 27+* | 27+* |
| Tensile Strength @ yield MPa (4) | 25.0 | 20.5 | 23.2 | 19.0 | 19.5 |
| Flexural Modulus MPa (5) | 906 | 693 | 783 | 640 | 649 |

*Did not break
(1) ASTM D-1238-79, Condition L
(2) ASTM D-256-78
(3) ASTM D-3029-78, Procedure B
(4) ASTM D-638-77
(5) ASTM D-790-71, Method 1A
(6) Two peroxide concentrations used, 250 and 150 ppm respectively.

It can be seen from the above Table, that the blended products are superior to the base resin in terms of impact properties. A comparison of product 1 with products 2 and 3 demonstrates that visbreaking alone does not give the impact resistance that the combination of blending and visbreaking does. Note that the visbroken blends did not suffer significant loss in tensile strength or stiffness compared to the non-blended polymer visbroken to similar melt flow rates.

EXAMPLE 3

Table No. 3 compares four different products. In the products in which visbreaking was used, the conditions were the same as the conditions used in the preceding examples. Product No. 1 is a visbroken reactor-made intimate mixture of polypropylene and randomly oriented copolymers of ethylene and propylene. Product No. 2 is an unvisbroken sample of impact grade propylene-ethylene copolymer, synthesized in the previously described two-reactor system so as to have a similar melt flow rate compared to the other products. Product No. 4 is a blend of 90 percent of product No. 1 with an ethylene vinyl acetate copolymer containing 8 percent vinyl acetate. Product No. 3 is a blend of 90 percent of the 0.54 MFR base polymer of Example 2 and an ethylene vinyl acetate copolymer containing 28 percent vinyl acetate (MFR=100+ under condition E of ASTM test D-1238-79). Products 3 and 4 were visbroken subsequent to the blending step.

TABLE NO. 3

| Property | Prod. No. 1 | Prod. No. 2 | Prod. No. 3 | Prod. No. 4 |
|---|---|---|---|---|
| Melt flow rate gm/10 min. (1) | 6.9 | 6.9 | 5.3 | 6.6 |
| Izod notched (23° C.), J/M (2) | 160 | 117 | 630 | 577 |
| Izod unnotched (−18° C.), J/M (3) | 817 | 550 | 1404 | 1079 |
| Gardner impact (−18° C.), NM (3) | 26.5 | 8.5 | 21.0 | 26.6 |
| Tensile Strength @ Yield MPa (4) | 22.9 | 24.2 | 20.0 | 20.2 |
| Flexural Modulus MPa (5) | 723 | 917 | 625 | 604 |

(1) ASTM D-1238-79, Condition L
(2) ASTM D-256-78
(3) ASTM D-3029-78, Procedure B
(4) ASTM D-638-77
(5) ASTM D-790-71, Method 1A It can be seen from the above Table that the products which are blended and then visbroken are superior to the other products in impact properties and still have good melt flow rate properties. Even at higher melt flow rates, there was not a radical change in tensile strength or stiffness.

I claim:

1. A high melt flow rate, high impact, visbroken polymeric composition comprising a a high propylene content first polymeric component which is selected from the group consisting of block copolymers of propylene and ethylene, reactor-made intimate mixtures of polypropylene and randomly oriented copolymers of propylene and ethylene, and blends of polypropylene and randomly oriented copolymers of propylene and ethylene and a second polymeric component having a higher impact than said first component, and which is selected from the group consisting of low density polyethylene, ethylene-vinyl acetate copolymers, acrylate-modified polyethylenes, high density polyethylene, ethylene-propylene rubber (EPR or EPDM), and blends thereof, wherein the two components are first blended and then visbroken.

2. A method for producing a high melt flow rate, high impact polymeric material which comprises the steps of:
   (a) blending a a high propylene content first polymeric component selected from the group consisting of block copolymers of propylene and ethylene, reactor-made intimate mixtures of polypropylene and randomly oriented copolymers of propylene and ethylene, and blends of polypropylene and randomly oriented copolymers of propylene and ethylene with a second polymeric component having a higher impact than said first component, and selected from the group consisting of low density polyethylene, ethylene-vinyl acetate copolymers, acrylate-modified polyethylenes, high density polyethylene, ethylene-propylene rubber (EPR or EPDM), and blends thereof, and
   (b) visbreaking the resulting blend.

3. The method of claim 2 wherein the blend is visbroken by treating it with from about 50 ppm to about 2000 ppm of a free radical initiator at a temperature of from about 350° F. to about 550° F.

4. The method of claim 3 wherein the free radical initiator is 2,5 dimethyl-2,5 bis (t-butyl peroxy) hexane.

5. The method of claim 3 wherein the blend is visbroken in an extruder.

6. The method of claim 5 wherein the blending and visbreaking are carried out in the same extruder.

7. The method of claim 2 wherein the blend is thermally visbroken in the absence of free radical initiators and processed and heat stabilizers at a temperature in excess of 550° F.

8. The method of claim 7 wherein the temperature is from about 600° F. to about 800° F.

9. The method of claim 7 wherein the visbreaking is carried out in an extruder.

10. The method of claim 9 wherein the blending and the visbreaking are carried out in the same extruder.

* * * * *